Jan. 9, 1962　　　M. E. ECKER ET AL　　　3,016,210
AUTOMATIC FILM TRANSPORT REVERSING MECHANISM
Filed Nov. 25, 1959　　　　　　　　　　　3 Sheets-Sheet 1

MARIO E. ECKER
JOHN A. LIGGETT
　　　INVENTORS

BY
　　　ATTORNEY

Jan. 9, 1962 M. E. ECKER ET AL 3,016,210
AUTOMATIC FILM TRANSPORT REVERSING MECHANISM
Filed Nov. 25, 1959 3 Sheets-Sheet 2

MARIO E. ECKER
JOHN A. LIGGETT
INVENTORS

BY
ATTORNEY

United States Patent Office 3,016,210
Patented Jan. 9, 1962

3,016,210
AUTOMATIC FILM TRANSPORT REVERSING MECHANISM
Mario E. Ecker, Pennsauken, and John A. Liggett, Haddonfield, N.J., assignors to Radio Corporation of America, a corporation of Delaware
Filed Nov. 25, 1959, Ser. No. 855,386
5 Claims. (Cl. 242—55.12)

This invention relates to sound motion picture film projectors, and particularly to a film transport reversible mechanism.

In sound motion picture projectors, the film is continuously advanced at certain points by sprockets having teeth which enter the film perforations. For projecting the picture, the film is advanced intermittently through a picture light path and is advanced continuously past a sound track detector, the latter being either a photoelectric cell receiving light variations or a magnetic reproducing head receiving magnetic variations. To obtain a constant film speed at the sound translation point, a sound stabilizer drum with a flywheel of substantial weight mounted on the drum shaft is used to filter out minute, irregular film movements at the translation point, the sound drum and flywheel being driven by the pull of the film over the sound drum.

When the projector motor is reversed, the film sprockets and the intermittent claw mechanism are reversed immediately. However, when the projector stops, the inertia of the flywheel continues to drive the sound drum, which takes up the film in the free loop between the intermittent mechanism and the sound drum. In a copending application of Mario E. Ecker and John J. Hoehn, Ser. No. 855,387, filed November 25, 1959, and assigned to the same assignee as that of the present invention, the details of a mechanism are disclosed and claimed which will restore the free loop during the reverse drive to avoid damage to the film.

The present invention is directed to the drive of the film reels and the film sprockets which permits the film to be reversed and then return to normal operation, and also permits rewinding the film at an increased rate of speed without changing film reels. By merely reversing the rotation of the drive motor, as by means of a reversing switch, and without altering the position of the drive mechanism for the film transport mechanism, the film transport mechanism can be made to either feed the film forward for normal projection or in reverse direction for reverse projection feeding of the film. The actuation of a separate control lever will shift the mechanism to a high rewind speed.

The principal object of the invention, therefore, is to provide improved film transport mechanism which will facilitate the reversal of a sound motion picture film for rewinding of the film to permit showing of the pictures thereon in reverse.

Another object of the invention is to provide an improved reversing mechanism for a sound motion picture projector for reverse showing of the pictures on a film, together with a high speed rewind mechanism.

A further object of the invention is to provide an improved reversing mechanism which shifts the film reel functions and provides a high speed rewind mechanism.

A better understanding of this invention may be had from the following detailed description when read in connection with the accompanying drawings, in which.

Figure 1:
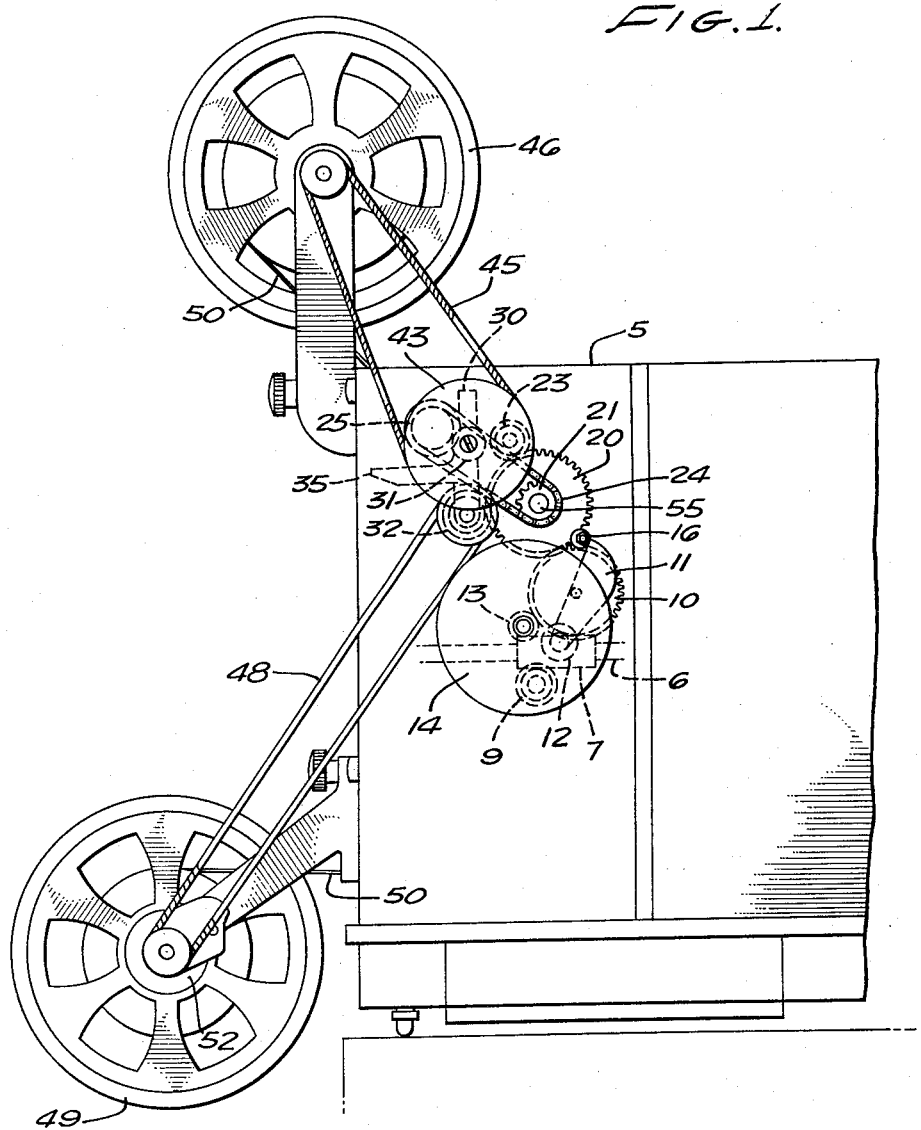
FIG. 1 is a rear elevational view of the projector showing the interconnection of the film reels to the film transport drive mechanism, the upper reel drive mechanism being shown in position for either normal, forward operation or normal, reverse operation.
Figure 2:
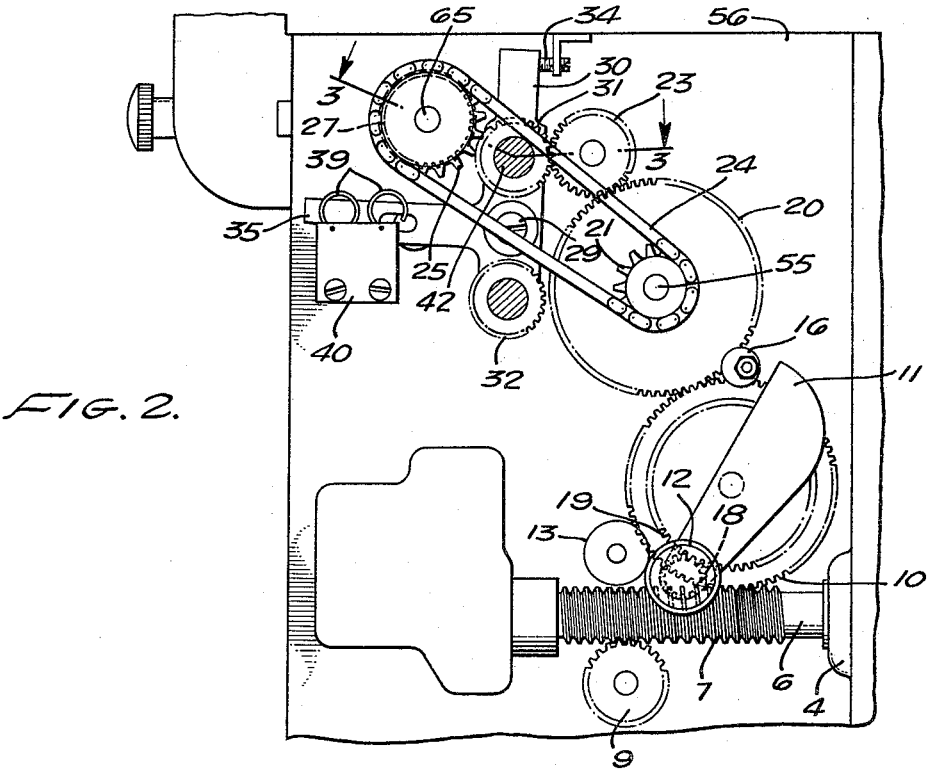
FIG. 2 is an enlarged partial view of the upper reel drive mechanism with the parts shown in fast rewind position.

Referring, now, to the drawings in which the same reference numerals identify the same elements, a film projector casing 5 is provided with the usual intermittent projector mechanism, projection lens, motor, and light source as described in the above-mentioned copending application. In FIGS. 1 and 2, the motor shaft 6 of a motor 4 is shown with a worm gear 7 which is in mesh with a gear 9 for driving the lower film sprocket (not shown), and also in mesh with a gear 10. A pivoted arm 11 is adapted to move a puck 12 into contact with the hub 13 of a flywheel 14, also described in detail in the above-mentioned copending application. An adjustable eccentric 16 limits counterclockwise rotation of the arm 11 (as seen in FIGS. 1 and 2) to the proper operating position.

As shown in FIG. 2, the lower end of arm 11 has a gear 18 thereon which is continually in mesh with a gear 19 pinned to the gear 10. The gear 10 is in mesh with a gear 20 on a shaft with a chain gear 21 which is driven through a one-way spring clutch 22 described hereinafter. The gear 20 is in continual mesh with a gear 23 which drives the upper film sprocket (not shown) of the projector. The gear 21 is connected by a chain belt 24 to a chain gear 25 which drives, through a slip clutch 26, described hereinafter, a gear 27.

Pivoted on a pivot 29 is an arm 30 having a gear 31 on the upper portion thereof and a gear 32 at the lower end thereof. The upper end of the arm 30 abuts an adjusting screw 34 to control the mesh of the gears 23 and 31. The arm 30 has an extension 35 thereon which is interconnected by springs 39 to a block 40 for the purpose of holding the gear 31 in mesh with either the gear 27 or the gear 23, and the gear 32 either in mesh with the gear 20 when the gear 31 is in mesh with the gear 27, or out of mesh with the gear 20 when the gear 31 is in mesh with the gear 23.

On a shaft 42 of the gear 31 is an upper reel belt pulley 43 which, by means of a belt 45, drives an upper or supply reel 46 in both forward and reverse, normal-speed operations. Positioned on the shaft of gear 32 is a pulley for a belt 48 which drives a takeup reel 49, a film 50 being shown passing from reel 46 to reel 49.

Figure 5:
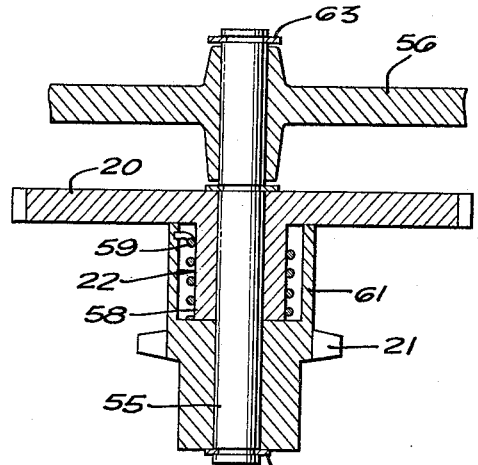
FIG. 5 is a cross-sectional view of the one-way spring clutch taken along the line 5—5 of FIG. 3.

Referring, now, to FIG. 5, this figure shows the one-way spring clutch for the purpose of coupling the chain sprocket 21 to the gear 20 only when the gear 20 is turning counterclockwise or in reverse, normal-speed operation. The gear 20 and sprocket 21 are mounted on a shaft 55 in the main frame casting 56. The gear 20 has a hub 58 around which is closely wound a left hand spring 59, one tang of the spring being fastened to the edge of the chain sprocket hub 61. The free inside diameter of the spring 59 is slightly less than the hub diameter of the gear 20. To retain the assembly on the shaft 55, a pair of C washers 62 and 63 is used. As mentioned above, this one-way spring clutch functions to connect the gear 20 to the chain sprocket 21 only when the gear 20 is turning counterclockwise. The connection is made by the frictional forces developed between the spring 59 and the hub of gear 20 since the gear 20 tends to wrap the spring around the hub, resulting in a gripping action. When the hub of the gear 20 rotates clockwise, the frictional forces developed between the spring 59 and the hub of the gear 20 tend to unwrap the spring from the hub of the gear, resulting in a slipping action.

Figure 6:
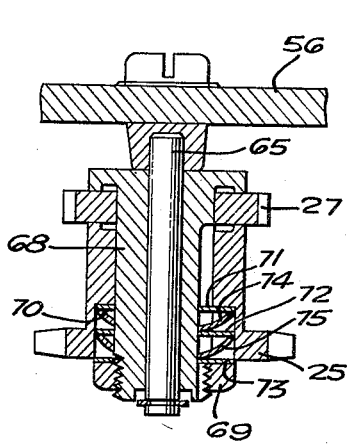
FIG. 6 is a cross-sectional view of the slip clutch taken along the line 6—6 of FIG. 3.
Figure 7:
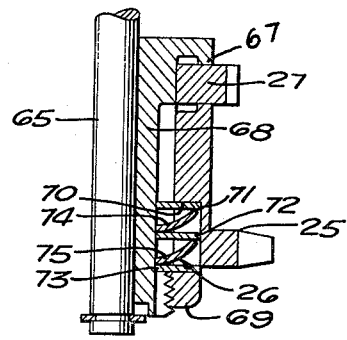
FIG. 7 is an enlarged, cross-sectional, partial view of the frictional elements used in the slip clutch shown in FIG. 6.

In FIGS. 6 and 7, the details of the spring slip clutch 26 are shown. This clutch provides the necessary torque for wrapping the film on the reel 46 as it comes off the upper film feed sprocket in normal-speed reverse operation. The chain sprocket 25 and the gear 27 are mounted on a shaft 65 attached to the main frame casting 56. Surrounding the shaft 65 is a sleeve 68 having grooves running axially thereof and which are adapted to mate with lands running axially on the inside diameter of the hub of the chain sprocket 25. The gear 27 which is free to rotate about the body of the sleeve 68 is held between a flange 67 of sleeve 68 and one face of the hub of the chain sprocket 25. Interposed between the face 70 of a recess in the other end of the hub of the chain sprocket 25 and the face of a nut 69 are three flat washers 71, 72, and 73, and two spring washers 74 and 75. As the nut 69 is advanced along the body of the sleeve 68, the spring washers 74 and 75 are deflected and a resulting force is exerted on the two faces of the gear 27 by the flange of sleeve 68 and the face of the hub of sprocket 25. This force is adjustable to permit the gear 27 to overcome the resistance of the reel 46 when this reel is loaded to its maximum film capacity. The threads on the nut 69 are undersized so the nut 69 acts as a locknut to maintain the torque adjustment.

The normal, forward operation from reel 46 to reel 49 will be first described. The motor worm 7 drives the gears 10 and 19 in a counterclockwise direction (as seen in FIGS. 1 and 2) for normal operation, which means that the gear 20 is driven in a clockwise direction for normal operation. In this direction of operation, the gear 19 drives the gear 18 to cause the arm 11 to move counterclockwise up against the eccentric stop 16. Thus, the arm 11 disconnects the puck 12 from the flywheel hub 13 of the film-pulled drum. Rotation of the gear 20 clockwise causes the spring clutch 22 to disconnect the gear 21 from its gear shaft, as explained above, and thus no drive is transmitted to the chain 24 and the sprocket 25. Since, in normal operation, although the gear 31 is in mesh with the gear 27 but the gear 27 is not being driven, there is no driving force imparted to the pulley 43, and the film 50 is thus pulled off the reel 46 by the film sprocket driven by gear 23. The tension in the belt 45 and the friction of the disengaged drive is sufficient to overcome the inertia of a full 2000 foot reel of film, and thus the film will only leave the reel at the speed of the film sprocket driven by gear 23.

In this normal operation, the gear 32 is in mesh with the gear 20, so that the belt 48 drives the reel 49 to take up the film. The reel 49 is driven through any suitable one-way, over-running slip clutch 52, such as shown in U.S. Patent No. 2,343,961 or U.S. Patent No. 2,217,183 if a holdback drag is desired during normal-speed reverse operation. These clutches compensate for variations in film roll diameter, a positive coupling action being provided only when the reel 49 is driven during takeup operation.

Now, when the motor worm 7 is reversed by the motor connected thereto, the gears 10 and 19 are reversed to rotate in a clockwise direction. The gear 19 then drives the gear 18 to swing the lever 11 clockwise and thus connect the puck 12 to the hub 13 of the flywheel 14 to restore the loose loop mentioned above, all as more fully described in the above-identified copending application. Clockwise rotation of the gear 10 will rotate the gear 20 in a counterclockwise direction to couple the gear 20 to the chain gear 21, as explained above. Thus, the chain gear 25 and the gear 27 are driven through spring clutch 26, as explained above. Since the gear 31 is still in mesh with the gear 27, the upper reel belt pulley 43 will rotate in a clockwise direction (FIG. 1), which will rotate the reel 46 in a clockwise direction and take up the film as it is fed thereto by the sprocket driven by gear 23, the required torque being provided by the adjustment of the nut 69. Now, since the belt 48 of reel 49 is reversed in direction, and the reel 49 is driven through a one-way, over-running clutch 52, the film 50 is free to leave the reel 49. The ratio of the chain sprocket gears and the gear 31 is such that the speed of takeup by the reel 46 will be slightly greater than the operating speed of the film as it leaves the sprocket driven by the gear 23.

Figure 4:
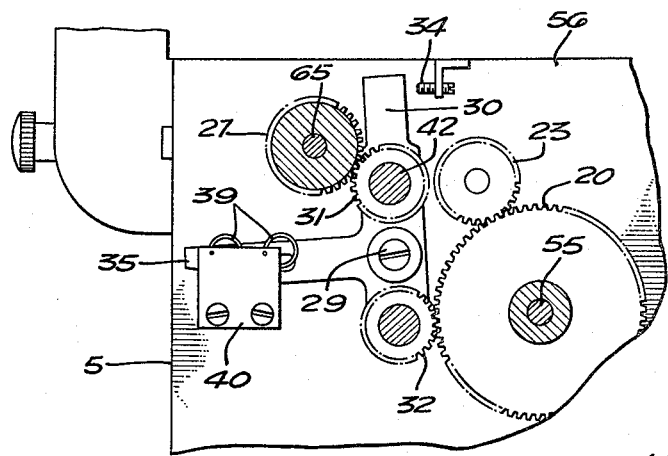
FIG. 4 is a partial view of the upper reel drive mechanism showing the parts in position for normal-speed forward and reversing operations.
Figure 3:
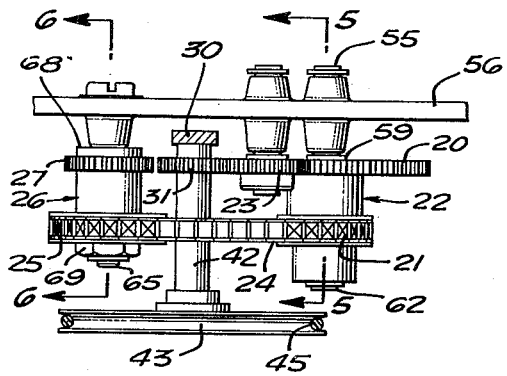
FIG. 3 is a detail view taken along the line 3—3 of FIG. 2.

As mentioned above, rewinding the film at a high rate of speed may be accomplished without changing reels. In this case, the motor 4 is conditioned to drive the gear 10 counterclockwise as in normal, forward operation. After the film has passed entirely through the film transport mechanism in normal, forward operation, the then loose, trailing film end is attached to the reel 46, and the arm 30 is then thrown manually to the position shown in FIG. 2 from that shown in FIG. 4, which is the normal-speed forward and reverse operating position of the arm 30. With the arm 30 in the position shown in FIG. 2, the gear 31 meshes with the sprocket gear 23 which is driven by the gear 20. The gear 31, therefore, drives the reel 46 through the pulley 43 and belt 45 at an increased rate of speed determined by the relative diameters of the gears 20, 23, and 31. Thus, by throwing a control lever (not shown) which shifts the arm 30 to the position shown in FIG. 2, rapid rewind is obtained without the interchange of reels.

The above mechanism, therefore, may be reversed in operation by reversal of the motor to reverse the film for any desired length thereof, and then again reversed by reversal of the motor to repeat the projection of the desired length of film in the normal manner. This is attainable by reason of the one-way spring clutch 22 and slip clutch 26 for the upper reel 46, and the one-way clutch 52 for the reel 49. By shifting the arm 30 by a rewind control lever, rapid rewind is accomplished by direct drive from the sprocket gear 23 through gear 31, pulley 43, belt 45, and reel 46.

We claim:

1. In a projector having a supply reel, a takeup reel, and film transport mechanism for moving a film from one to the other of said reels, the combination of driving means, means responsive to said driving means for actuating said mechanism selectively either for forward operation thereof to advance a film in a forward direction from said supply reel to said takeup reel at a normal speed or for reverse operation thereof to return said film in a reverse direction from said takeup reel to said supply reel at a speed comparable to said normal speed, said second-named means including a clutch device adapted to connect said driving means to said supply reel only during said reverse operation of said film transport mechanism, means for positively driving said takeup reel during said forward operation of said transport mechanism, said last-named means including means for releasing said takeup reel from positive drive during said reverse operation of said mechanism, and means for selectively driving said supply reel at a speed higher than said normal speed for rewinding said film rapidly from said takeup reel directly to said supply reel, said last-named means including a member constantly coupled to said supply reel for transmitting torque to said supply reel.

2. In a projector having a supply reel, a takeup reel, and film transport mechanism for moving a film from one to the other of said reels, the combination of driving means, means responsive to said driving means for actuating said mechanism selectively either for forward operation thereof to advance a film in a forward direction from said supply reel to said takeup reel at a normal speed or for reverse operation thereof to return said film in a reverse direction from said takeup reel to said supply reel at a speed comparable to said normal speed, said second-named means including a clutch device adapted to connect said driving means to said supply reel only during said reverse operation of said film transport mechanism, means for positively driving said takeup reel during said forward operation of said transport mechanism, said last-named means including means for releasing said takeup reel from positive drive during said reverse operation of said mechanism, and means for selectively driving said supply reel at a speed higher than said normal speed for rewinding said film rapidly from said takeup reel directly to said supply reel, said second-named means including a first gear operable at a relatively low speed and a second gear operable at a relatively high speed, said means for selectively driving said supply reel including a third gear coupled to said supply reel and shiftable for selective engagement with either said first gear for operation at relatively low speed during said reverse operation or said second gear for operation at a relatively high speed during rewind operation.

3. A projector film transport mechanism in accordance with claim 2 in which said means for positively driving said takeup reel includes a gear driven by said driving means when said shiftable gear is in engagement with said first gear and which is disconnected from said driving means when said shiftable gear is in engagement with said second gear.

4. A film transport mechanism for a projector comprising a drive motor, continuously rotatable sprockets driven by said motor, a takeup reel, a supply reel, and interconnecting means between said sprockets and reels for transporting film selectively in opposite directions between said reels and over said sprockets at substantially the same speed and at a higher speed directly between said reels for rewinding said film, said means including a first chain of gears from said motor for positively driving said takeup reel in forward direction, said gears being disconnectable within said first chain during the rewinding of said film, and a second chain of gears from said motor for driving said supply reel in reverse direction, said film being driven in normal, forward and reverse directions by said sprockets, and said second chain of gears including a gear shiftable to vary the speed of said supply reel when said supply reel is driven in said reverse direction to take up film thereon.

5. In a projector having a supply reel, a takeup reel, and film transport mechanism for moving a film from one to the other of said reels, the combination of driving means, means responsive to said driving means for actuating said mechanism selectively either for forward operation thereof to advance a film in a forward direction from said supply reel to said takeup reel at a normal speed or for reverse operation thereof to return said film in a reverse direction from said takeup reel to said supply reel at a speed comparable to said normal speed, said second-named means including a clutch device adapted to connect said driving means to said supply reel only during said reverse operation of said film transport mechanism, means for positively driving said takeup reel during said forward operation of said transport mechanism, said last-named means including means for releasing said takeup reel from positive drive during said reverse operation of said mechanism, and means for selectively driving said supply reel at a speed higher than said normal speed for rewinding said film rapidly from said takeup reel directly to said supply reel, said means for driving said supply reel during reverse operation including a first chain sprocket driven through said clutch device, a second chain sprocket, a chain interconnecting said chain sprockets, a pulley gear for said supply reel, said pulley gear being driven by said second chain sprocket, and a belt for driving said supply reel by said pulley gear.

References Cited in the file of this patent

UNITED STATES PATENTS

| | | |
|---|---|---|
| 2,666,594 | Jungjohann | Jan. 19, 1954 |
| 2,718,361 | Evraets | Sept. 20, 1955 |